United States Patent [19]

Davis

[11] Patent Number: 5,372,212

[45] Date of Patent: Dec. 13, 1994

[54] SUSPENSION FOR A TRACKED VEHICLE

[75] Inventor: John P. Davis, Norfolk, United Kingdom

[73] Assignee: Group Lotus Limited, Norfolk, United Kingdom

[21] Appl. No.: 240,966

[22] Filed: May 10, 1994

Related U.S. Application Data

[63] Continuation of Ser. No. 910,258, Sep. 16, 1992, abandoned.

[30] Foreign Application Priority Data

Jan. 17, 1990 [GB] United Kingdom ............... 9001071

[51] Int. Cl.$^5$ .............................................. B62D 55/30
[52] U.S. Cl. ..................................... 180/9.1; 180/9.52
[58] Field of Search ................. 180/9.1, 9.52; 280/707; 305/10

[56] References Cited

U.S. PATENT DOCUMENTS

| | | | |
|---|---|---|---|
| 3,360,063 | 12/1967 | Hausenblas et al. | 180/9.1 |
| 4,513,833 | 4/1985 | Sheldon . | |
| 4,545,624 | 10/1985 | Van Ooyen . | |
| 4,840,437 | 6/1989 | Henry et al. | 305/10 |
| 4,898,257 | 2/1990 | Brandstadter | 180/9.1 |
| 5,097,916 | 3/1992 | Brandstadter | 180/9.1 |

FOREIGN PATENT DOCUMENTS 0332869 9/1989 European Pat. Off. .
2484352 12/1980 France .

*Primary Examiner*—Mitchell J. Hill
*Attorney, Agent, or Firm*—Fulwider Patton Lee & Utecht

[57] ABSTRACT

A suspension system for a tracked vehicle includes a track and an associated wheel assembly a U-track tensioning assembly and a plurality of road wheels are adapted to be disposed adjacent to the surface over which the vehicle is moving and transfer the weight of the vehicle to the surface via the track. A microprocessor is provided to control the track tensioning assembly in response to tensioning signals. In a preferred embodiment, the track tensioning assembly comprises a tensioning wheel which is not a road wheel and a strut connected to the tensioning wheel and operable to apply force to the tensioning wheel, thereby tensioning the track.

21 Claims, 2 Drawing Sheets

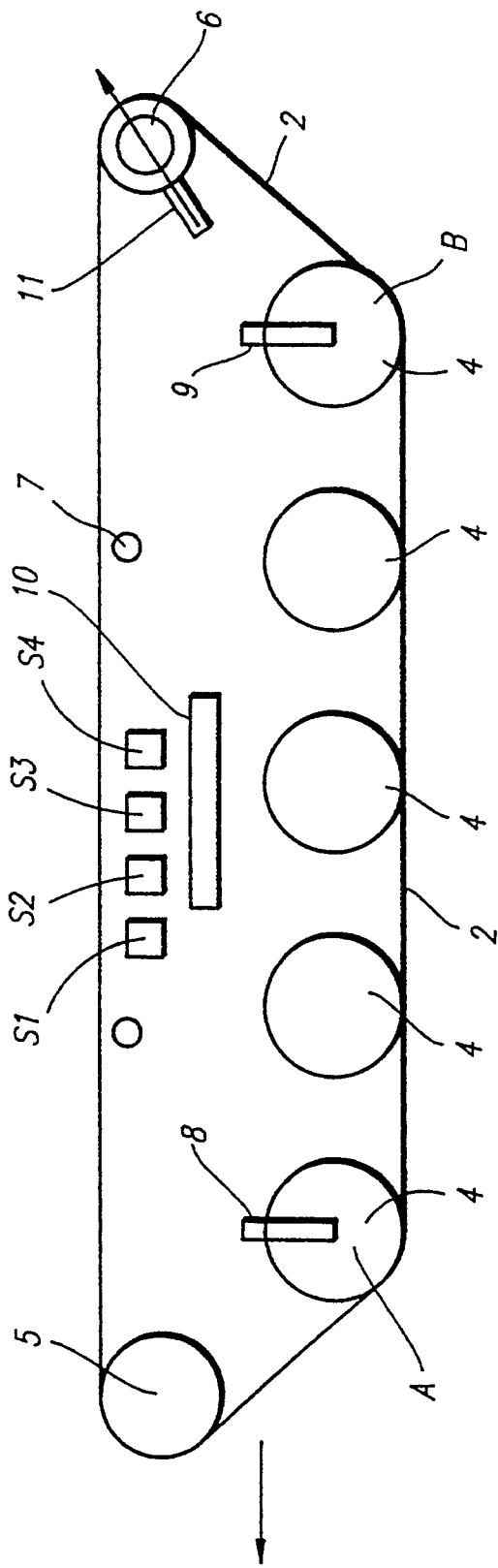

SUSPENSION FOR A TRACKED VEHICLE

This application is a continuation of application Ser. No. 07/910,258, filed Sep. 16, 1992, now abandoned.

BACKGROUND OF THE INVENTION

1. Field of the Invention

This invention relates to tracked vehicles and to track tensioning systems.

1. Description of Related Art

Conventional tracked vehicles with conventional, non-active, suspension systems maintain a substantially constant track tension by tensioning means which can be considered as a spring-biassed tensioning wheel, or wheels, stretching the track to a desired tension dependant upon the geometry of the road wheels and track, the position being dependent on the load applied to the tensioning wheel by the track.

It is also known to have a tracked vehicle with an active suspension in which road wheels of the vehicle's wheel assemblies are actively controlled by a microprocessor in response to input signals relating to behaviour of the vehicle. (By "active suspension" is meant a suspension in which the position of a wheel is controlled by an actuator controlled by a microprocessor). The position of the road wheels is a factor determining the tension in the track of the wheel assemblies and the movement of the road wheels under active control to improve vehicle movement is constrained by their dual function as determining the track tension. Thus the known tracked vehicles with active suspension have their track tension determined at least in part by the position of their road wheels.

It is the aim of the present invention to provide an improved suspension system for a tracked vehicle.

SUMMARY OF THE INVENTION

According to a first aspect the invention consists in a suspension for a tracked vehicle comprising a track extending around an associated wheel assembly, and track tensioning means, the wheel assembly comprising a plurality of road wheels adapted to be disposed adjacent to the surface over which the vehicle is moving and adapted to transfer the weight of the vehicle to the surface via the track, and at least one driven wheel adapted to drive the track; the suspension further comprising microprocessor control means controlling the position of the track tensioning means in response to tensioning signals fed to the control means representative of pre-determined input variables, and in which the track tensioning means is not a road wheel but is separate means.

By having the track tensioning means controlled separately from the road wheels the movement of the track tensioning means is not constrained by the ride requirement of the road wheels and vice-versa. The track tensioning means can be dedicated solely to maintaining the desired track tension.

Preferably the suspension further comprises first stage means for rapidly tensioning the track, and the microprocessor is adapted to control the first stage means during a high-tension transition in which the track tension is increased such that during an initial stage the first stage means is actuated so as to tension the track relatively rapidly. This allows a rapid change in track tension when this is desired.

Preferably the microprocessor control means also controls the track tensioning means, and the first stage means, so as to advance the track tensioning means after the initial stage so as to take up the track tension from the first stage means and thereafter, or simultaneously, move the first stage means back towards their normal operating position. This movement of the track tensioning means may be at a relatively slow rate in comparison with the movement of the first stage means in the initial stage. Thus the increase in track tension may comprise an initial fast stepping of the first stage means followed or accompanied by a more gradual movement of the tensioning means to take up the tension from the first stage means.

Automatic means for instigating the high tension transition may be provided. For example, automatic means may respond to signals indicative of manoeuvring of the vehicle. The automatic means may respond to differential braking or acceleration between tracks, or their associated wheel assemblies, in order to detect manoeuvring.

There may also be means to detect a rough vehicle ride and to alter the track tension in response to a rough vehicle ride. The tension in the track may be increased or decreased in response to a rough vehicle ride; for instance it is preferable in some situations to reduce track tension over rough ground to allow greater suspension travel. A low pass filter may be provided to filter signals indicative of heave and/or pitch of the vehicle and the microprocessor may calculate the desired position of the track tensioning means for the given, relatively steady, state of heave or pitch to give the desired track tension and then move the track tension accordingly.

The invention can be employed in a tracked vehicle with active suspension in which the road wheels are controlled by actuators controlled by the microprocessor so as to give the required ride of the body of the vehicle, whilst the track tensioning means can be moved by the microprocessor to maintain the tension of the track substantially independently of the movement of the road wheels, and to a track tension which can be variable under control of the microprocessor control means.

The first stage means may comprise one or more actively controlled road wheels, or separate means may be provided as the first stage means.

Preferably at least one of the road wheels has an actively controlled wheel control means associated with it which controls the position of the road wheel in response to wheel signals fed to it by the microprocessor control means. A series of consecutive adjacent road wheels is preferably provided and the first and last road wheels of the series, being the foremost and hindmost road wheels relative to the normal direction of travel of the vehicle, have respective associated actively controlled wheel control means controlled by the microprocessor control means.

The microprocessor control means may be adapted to control the wheel control means during a high-tension transition in which the track tension is increased such that during an initial stage at least one road wheel is urged rapidly downwards towards the surface over which the vehicle is travelling so as to tension the track relatively rapidly.

The microprocessor control means may be operable to control the suspension in a stationery locked mode in which, when the vehicle is stationery, the actively controlled road wheel or wheels is moved fully downwards towards the surface, and the wheel control means of the wheel or wheels is then locked in position, the track tensioning means also being urged to a fully advanced position in which it tensions the track highly so as to lock the track.

In one preferred embodiment the track tensioning means comprises a tensioning wheel in contact with the track and a single or double acting strut connected to the tensioning wheel, said tensioning wheel not being a road wheel and said single or double acting strut being operable to force said tensioning wheel against the track to tension the track. In this embodiment a series of adjacent road wheels; is preferably provided and the first and last road wheels of the series, being the foremost and hindmost road wheels in the normal direction of travel of the vehicle, are provided with sensors for measuring their displacement relative to the body of the vehicle. The microprocessor preferably calculates and sums together the distance between the hindmost roadwheel the foremost roadwheel, the distance between foremost roadwheel and the tensioning wheel, the distance between the tensioning wheel and a fixed reference wheel in contact with the track and the distance between the fixed reference wheel and the hindmost wheel and the microprocessor then controls the double or single acting strut to move the tensioning wheel until the sum of distances between the said wheels corresponds to that required for a desired track tension.

According to a second aspect the invention consists in a tracked vehicle incorporating a suspension in accordance with the first aspect of the invention.

According to a third aspect the invention consists in a method of increasing the tension of the track of a tracked vehicle which has first stage means adapted to tension the track and actively controlled track tensioning means which is not a road wheel, the method comprising the steps of: rapidly urging the first stage means towards the track in an initial stage in which the rapid downward movement of the road wheel tensions the track; and subsequently moving the track tensioning means in a subsequent stage in which the track tensioning means takes up the tension in the track from the first stage means whilst the first stage means is withdrawn back towards its retracted position.

The movement of the track tensioning means in the subsequent stage may be relatively slow in comparison with the downward movement of the first stage means in the initial stage.

An embodiment of a tracked vehicle embodying the invention and a modification hereof will now be described by way of example only with reference to the accompanying drawings.

BRIEF DESCRIPTION OF THE DRAWINGS

FIG. 1 schematically illustrates a suspension of a vehicle;

FIG. 2 shows a tracked vehicle having the suspension of FIG. 1 when it is on a slope.

DETAILED DESCRIPTION OF THE PREFERRED EMBODIMENTS

Figure 3:
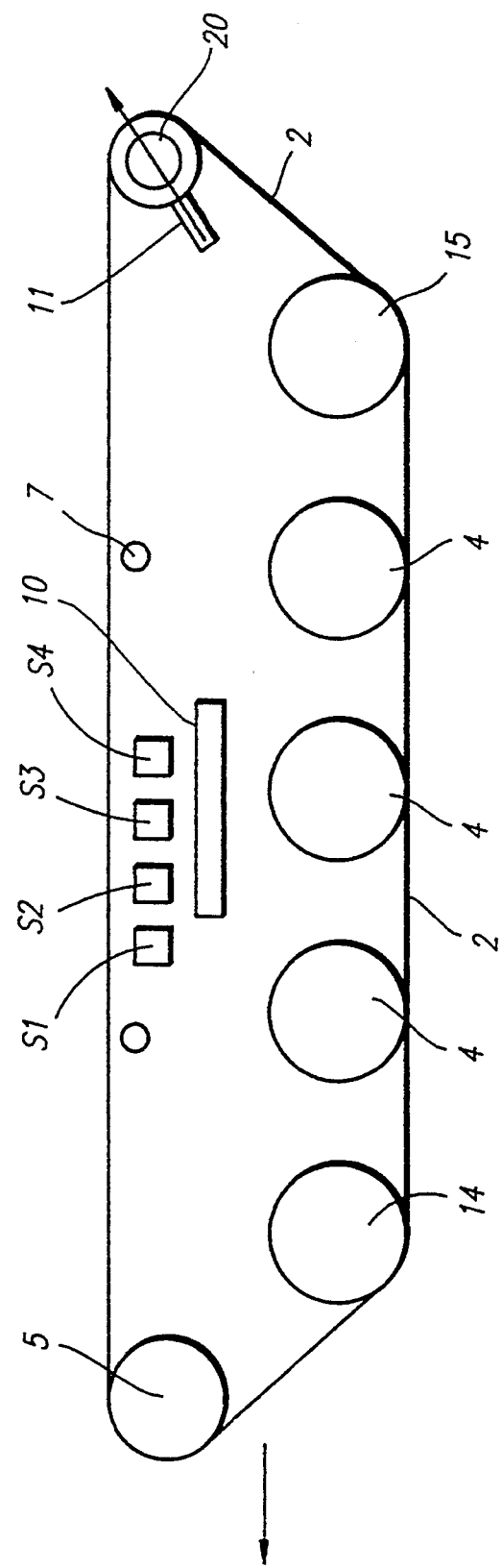
FIG. 3 shows a second embodiment of a vehicle suspension.

FIGS. 1 and 2 of the drawings illustrate a tracked vehicle 1 having two tracks 2 and associated wheel assemblies 3. FIG. 1 illustrates one side of the vehicle and shows a track and associated wheel assembly. The wheel assembly comprises a series of road wheels 4, a driven wheel 5, a track tensioning wheel 6, and idler wheels 7. The forwardmost road wheel A and rearmost road wheel B are each controlled by respective active control struts 8 and 9 which are in turn controlled by a computer or microprocessor control unit 10. The position of the track tenioning wheel 6 is controlled by a tensioning strut 11 which is also controlled by the microprocessor unit 10. The road wheels between road wheels A and B are sprung on the chassis of the vehicle and are not controlled by the microprocessor 10.

The struts 8 and 9 can be either single acting struts or double acting struts depending upon the speed of upward movement of the wheels A and B that is required. The tensioning strut 11 need only be a single direction strut since energy is only needed to move the tensioning wheel 6 outwards, the tension in the track returning the wheel inwards of its own accord. The struts are hydraulic, but could be powered by any suitable means. Our European Patent Application Publication No. 0114757 discloses an active suspension system.

The desired track tension depends upon several input conditions, for example the required ride height, the required pitch angle of the vehicle, the road input (for example bumps and depressions), and driver inputs (for example accelerating, braking, and turning all tend to throw the body of the tracked vehicle relative to its road wheels). The driver inputs and the road inputs tend to apply forces on the body which act for instance to cause the vehicle to pitch and to roll.

When the tracked vehicle is running on a road it is desirable to have the track relatively loose so as to reduce power consumption due to the friction between the track and the wheels. In fact there is an optimum track tension because overtight roads absorb energy via friction and over-loose tracks absorb energy since they tend to flap.

The microprocessor 10 is adapted to maintain a desired height when the tracked vehicle is on a road. The active control struts 8 and 9 are provided in combination with conventional spring arrangements (not shown) for the wheels A and B so that at the desired road-running height the active control struts 8 and 9 consume little or no hydraulic power. The springs are generally chosen to fully support vehicle weight at the desired road ride height so that no hydraulic power is used by the active control struts.

The position of the track tensioning wheel 6 to give the desired road-running height of the suspension is calculated from the desired height, the position of the road wheels 4, the geometry of the suspension, and the inextensible length of the track 2.

When a tracked vehicle manoeuvres it is necessary to have a tighter track tension or else the track will come off the wheel assembly. Thus the desired track tension for manouevring is higher than the desired track tension for driving along a road in a relatively straight line. It is always necessary to maintain a minimum track tension to prevent the track coming off the wheel assembly.

The suspension system of FIG. 1 detects the fact that a manoeuvring situation exists by any suitable means. For example by detecting the movement of brake levers and/or acceleration pedal corresponding to each track, or the fluid pressure in the brake circuits, or from a sudden change in a signal representative of the velocity of the tracked vehicle, lateral or longitudenal acceleration of the tracked vehicle. Sensors S1, S2, S3 and S4 represent a brake sensor, velocity sensor, lateral accelerometer and longitudinal accelerometer respectively.

Once a manoeuvring situation has been detected the microprocessor controls the actively controlled road wheels A and B (which constitute first stage means) so as to extend them downwards to a desired calculated depressed or lowered extent in a fast first transitional stage. This takes up any slackness in the track 2 and ensures that the track has a high tension. However, with the road wheels A and B at their depressed or lowered positions the ride in the vehicle suffers since they can no longer be under unrestrained active control from the microprocessor 10 to control the ride of the vehicle. If the microprocessor detects that the wheels A and B are maintained at around their lowered position for a significant period of time the microprocessor moves the track tensioning wheel 6 outwards at a relatively slow speed to a position which it has calculated will take up the tension in the track from the road wheels A and B and allow the road wheels A and B to return towards their mean actively controlled operational position. A low-pass filter is incorporated to enable the microprocessor to move the track tensioning wheel 6 in response in response only to long term signals. The microprocessor thus controls the track tensioning device to extend it to compensate for the retraction of the road wheels A and B. The position of the track tensioner is calculated by the microprocessor 10, rather than by maintaining any predetermined load on the tension in the manner of known tensioning devices.

When the signals from sensors S1, S2, S3, S4 indicate that there is no longer any need for a high track tension the microprocessor gradually retracts the tensioning wheel 6 to slacken the tension back towards the lower tension for normal road running.

In the first preferred embodiment the microprocessor controls the wheels A, B and the wheel 6 to maintain constant a calculated parameter which shall be referred to as the "track perimeter". The "track perimeter" is calculated as the sum of the following four distances; the distance from the wheel 5 to the wheel 6, the distance from the wheel 6 to the wheel B, the distance from the wheel B to the wheel A and the distance from the wheel A to the wheel 5. The "track perimeter" is proportional to the tension in the track. Therefore to maintain a desired track tension the processor controls the three wheels A, B and 6 (5 being fixed) to maintain the "track perimeter" corresponding to the desired track tension.

When the tracked vehicle is travelling over rough ground its speed may be limited by the hull of the tracked vehicle grounding on projections. The active suspension of the tracked vehicle allows the hull of the tracked vehicle to be raised up from the ground whilst maintaining the same track tension as when the road wheels 8 and 9 are disposed about their mean desired travelling position by depressing the wheels 8 and 9 and simultaneously retracting the tensioning wheel 6. By proper control of the wheels A and B and tensioning wheel 6 the microprocessor 10 can set the hull of the tracked vehicle to different heights above the ground. A manual control may be provided to do this, or ground clearance can be controlled by automatic detection of the full travel of either of the struts 8 or 9 (indicating that their mean position should be lowered), or by use of a pre-view sensor such as an infra-red or radio sensor detecting the ground ahead of the tracked vehicle.

The tracked vehicle can be arranged to run with a permanent pitch angle to give a larger front ground clearance. This is useful for sudden dips in the ground, and if a gun is mounted on the tracked vehicle the elevation of the gun can be increased by tilting the hull body of the tracked vehicle. The range of the gun can be increased in this way, even when the tracked vehicle is moving. Equally, the front end of the tracked vehicle can be lowered to give a pitch in the opposite sense to enable a gun to be depressed towards the ground to a greater extent than if the tracked vehicle were horizontal. This can be useful if the tracked vehicle is at the top of a hill and wishes to shoot down the hill.

By controlling the height of the two tracks and associated wheel assemblies of the tracked vehicle independently the tracked vehicle can be tilted in roll, as illustrated in FIG. 2, to set itself level if it is on the side of a hill, or to increase the elevation of a gun when the gun is pointing sideways, even when the tracked vehicle is moving.

A low frequency mean roll angle function can be incorporated into the microprocessor so that the tracked vehicle can level itself automatically when it is on the side of a hill. This function effectively cancells out any long duration roll by appropriate adjustment to the suspension.

A further use of the suspension system, particularly if used in a tank, is to enhance the control of a gun platform during firing of the gun when the tracked vehicle is stationary. The microprocessor control 10 generates an exceptionally high track tension by extending the struts 8 and 9 to predetermined required downward positions (for example their maximum downward position), then closing the hydraulic valves in the pistons of the struts so as to lock the struts in their fully extended position and prevent further movement of the struts, and then the track tensioning wheel 6 is extended to its fullest extent to lock the track up. This provides a particularly rigid track structure which enables greater accuracy with the gun of the tracked vehicle. In the embodiment described the first stage means comprises the actively controlled wheels A and B, however, it will be appreciated that separate first stage means for rapidly increasing the tension in the track could be provided in the illustrated active suspension of the tracked vehicle, or even in a tracked vehicle without actively controlled road wheels.

FIG. 3 illustrates a suspension for a tracked vehicle with road wheels which are not actively controlled. Similar reference numerals to those used in FIGS. 1 and 2 have been given to similar components. The road wheels 4 are sprung on conventional spring means, and actively controlled means 20 is provided to tension the track 2. The actively controlled means comprise hydraulic actuators controlled by the microprocessor 10.

In a simple control system for the system with the non-active road wheels when the microprocessor 10 detects that a manoeuvering situation exists, or that the ground is rough, or is otherwise induced to instigate a high-tension transition (for example by a manual control), a hydraulic ram of the means 20 is extended rapidly to tension the track quickly. When the sensors S1, S2, S3, S4, indicate that there is no longer any need for a high track tension the microprocessor controls the means 20 to slacken the tension gradually.

In a more advanced system the microprocessor 10 acts to maintain a constant "track perimeter", a term already explained and which shall hereinafter be described. The tension of the track 2 is dependent on the position of the wheels 5, 6, 14 and 15. In the embodiment the wheel 5 is fixed. The wheels 14 and 15 are connected to the body of the vehicle by passive suspension elements (springs and dampers not shown). The wheels 14 and 15 therefore move as the vehicle passes over the terrain. Sensors (not shown) are provided to determine the displacement of the wheels from their position at the desired vehicle ride height on level ground.

The microprocessor 10 in the more advanced system acts to control the extension of strut 11 to tension the track 2 by displacing the wheel 6. The microprocessor 10 acts to keep constant a calculated parameter which is herein referred to as "track perimeter" a calculated value for a particular desired track tension. The "track perimeter" in the embodiment of FIG. 3 is the sum of the following four distances; between the centres of the wheels 5 and 14, 14 and 15, 15 and 20 and 20 and 5. The "track perimeter" is proportional to the tension of the track 2. Therefore when the microprocessor has calculated a desired track tension the microprocessor continuously varies the position of the wheel 20 to maintain a "track perimeter" which corresponds to the desired track tension.

I claim:

1. A suspension for a tracked vehicle comprising a track extending around an associated wheel assembly, and track tensioning means, the wheel assembly having a plurality of road wheels adapted to be disposed adjacent the surface over which the vehicle is moving and adapted to transfer the weight of the vehicle to the surface via the track, and at least one driven wheel adapted to drive the track, the track tensioning means comprising microprocessor control means for controlling the track tensioning means in response to tensioning signals fed to the control means representative of predetermined input variables; wherein the track tensioning means comprises a tensioning wheel in contact with a portion of the track which is not in engagement with the surface over which the vehicle is moving and a tensioning strut for varying the position of the tensioning wheel, the tensioning strut being connected to the tensioning wheel such that the position of the tensioning wheel can be varied without variation in position of any of the road wheels;

the microprocessor control means calculates a desired position for the tensioning wheel; and the microprocessor control means controls the tensioning strut to move the tensioning wheel to the calculated desired position.

2. A suspension according to claim 1 which further comprises first stage means for rapidly tensioning the track, and in which the microprocessor is adapted to control the first stage means during a high-tension transition in which the track tension is increased such that during an initial stage the first stage means is actuated so as to tension the track relatively rapidly.

3. A suspension according to claim 2 in which following the initial stage the microprocessor control means controls the track tensioning means and first stage means in a second, compensatory, stage so as to advance the track tensioning means to take up the track tension from the first stage means, and thereafter, or simultaneously, move the first stage means back towards their normal operating position.

4. A suspension system according to claim 3 in which the compensatory stage occurs at a slower rate than the initial stage.

5. A suspension for a tracked vehicle according to claim 4 in which a series of adjacent road wheels is provided and the first and last road wheels of the series, being the foremost and hindmost road wheels in the normal direction of travel of the vehicle, are provided with sensors for measuring their displacement relative to the body of the vehicle.

6. A suspension for a tracked vehicle according to claim 5 in which a microprocessor calculates and sums together the distance between the hindmost roadwheel the foremost roadwheel, the distance between foremost roadwheel and the tensioning wheel, the distance between the tensioning wheel and a fixed reference wheel in contact with the track and the distance between the fixed reference wheel and the hindmost wheel and the microprocessor then controls the double or single acting strut to move the tensioning wheel until the sum of distances between the said wheels corresponds to that required for a desired track tension.

7. A suspension according to claim 2 in which first stage means comprises one or more actively controlled road wheels and in which the microprocessor control means is adapted to control the wheel control means during a high-tension transition in which the track tension is increased such that during an initial stage at least one road wheel is urged rapidly downwards towards the surface over which the vehicle is travelling so as to tension the track relatively rapidly.

8. A suspension according to claim 2 in which automatic means for instigating the high-tension transition is provided.

9. A suspension according to claim 8, further comprising sensor means for generating differential braking and acceleration inputs indicative of maneuvering of the vehicle, and wherein the automatic means responds to said inputs indicative of manoeuvering of vehicle.

10. A suspension according to claim 9, wherein said sensor means senses differential braking and acceleration between tracks of the vehicle, and wherein the automatic means respond to said differential braking and acceleration inputs between tracks of the vehicle in order to detect maneuvering of the vehicle.

11. A suspension according to claim 9 in which the automatic means responds to said differential braking inputs between tracks of a vehicle in order to detect maneuvering of the vehicle.

12. A suspension according to claim 9 in which the automatic means responds to said differential acceleration inputs between tracks of a vehicle in order to detect maneuvering of the vehicle.

13. A suspension according to claim 2 in which the microprocessor control means is operable to control the suspension in a stationary locked mode in which, when the vehicle is stationary, the first stage means is moved fully towards its tensioning position and then locked in position, the track tensioning means also being urged to a fully advanced position in which it tensions the track highly so as to lock the track.

14. A suspension according to claim 1 in which actively controlled wheel control means is associated with at least one of the road wheels and controls the position of said road wheel in response to wheel signals fed to the wheel control means by the microprocessor control means.

15. A suspension according to claim 14 in which a series of consecutive adjacent road wheels is provided and the first and last road wheels of the series, being the foremost and-hindmost road wheels relative to the normal direction of travel of the vehicle, have respective associated actively controlled wheel control means controlled by the microprocessor control means.

16. A suspension according to claim 1 in which the track tensioning means is controlled by the microprocessor control means when a rough vehicle ride is detected so as to alter the track tension.

17. A suspension according to claim 16 in which a low pass filter filters signals indicative of heave and/or pitch and/or roll of the vehicle and the filtered signals are supplied to the microprocessor, and the microprocessor calculates the desired position of the track tensioning means for the given relatively steady state of heave or pitch or roll to give the desired track tension and moves the track tensioner accordingly.

18. A suspension according to claim 1 wherein the tensioning strut comprises a single acting strut connected to the tensioning wheel, said single acting strut being operable to force said tensioning wheel against the track to tension the track.

19. A tracked vehicle incorporating a suspension in accordance with claim 1.

20. A method of increasing the tension of the track of a tracked vehicle which has first stage means adapted to tension the track and actively controlled track tensioning means which is not a road wheel, the method comprising the steps of: rapidly urging the first stage means towards the track in an initial stage in which the rapid movement of the first stage means tensions the track; and subsequently moving the track tensioning means in a subsequent stage in which the track tensioning means takes up the tension in the track from the first stage means whilst the first stage means is withdrawn back towards its retracted position.

21. A method according to claim 20 in which the movement of the track tensioning means in the subsequent stage is relatively slow in comparison with the movement of the first stage means controlled in the initial stage.

* * * * *